Oct. 20, 1970
JAMES E. WEBB  
ADMINISTRATOR OF THE NATIONAL AERONAUTICS  
AND SPACE ADMINISTRATION  
INSPECTION GAGE FOR BOSS  
Filed May 8, 1968
3,534,480
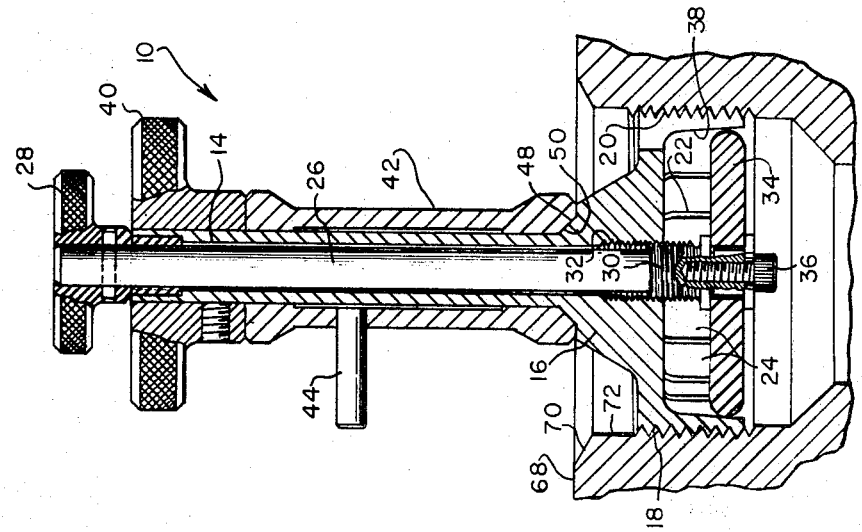
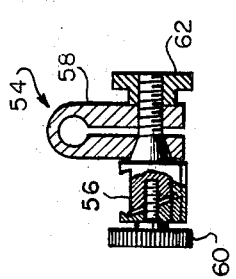
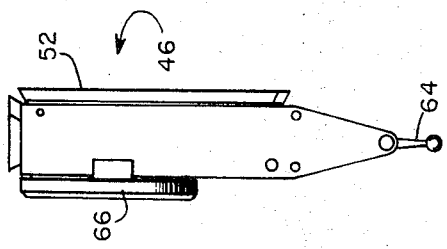
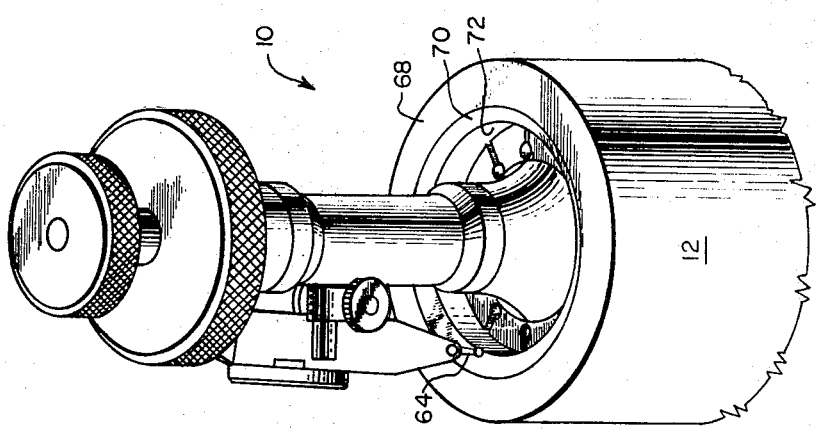
WALLACE J. JORDAN,  
JAMES T. WHISENANT,  
INVENTORS
BY  *I fm<sup>c</sup> Coy*  
*Charles C. Wells*  
ATTORNEYS United States Patent Office 3,534,480
Patented Oct. 20, 1970

3,534,480
INSPECTION GAGE FOR BOSS
James E. Webb, Administrator of the National Aeronautics and Space Administration, with respect to an invention of Wallace J. Jordan and James T. Whisenant, both of Huntsville, Ala.
Filed May 8, 1968, Ser. No. 727,480
Int. Cl. G01b 5/25
U.S. Cl. 33—174                    3 Claims

ABSTRACT OF THE DISCLOSURE

A gage for checking the concentricity and squareness of sealing surfaces on an internally threaded boss relative to the pitch diameter of the threads. The gage includes a split collet threadable into the boss, an axially driven camming disc for locking the collet against rotation relative to the boss, and a sleeve rotatably mounted on the housing. The sleeve has a dial indicator mounted thereon which can be adjusted to contact the surfaces to be gaged whereby upon rotation of the sleeve and dial indicator any irregularities in the surfaces being gaged will be displayed on the face of the dial indicator.

BACKGROUND OF THE INVENTION

The invention described herein was made in the performance of work under a NASA contract and is subject to the provisions of Section 304 of the National Aeronautics and Space Act of 1958, Public Law 85–568 (72 Stat. 435; 42 U.S.C. 2457).

The design and fabrication of space vehicles, rockets and aircraft require the use of high pressure fluids of various types. Space vehicles, for example, often have high pressure helium bottles on board so as to provide a source of fluid pressure to operate various components of the vehicle or possibly provide pressurization for the fuel tanks. In order for these high pressure fluids to be used, it is necessary that the pressure source be connected to the place or component where it is to be used through suitable plumbing. Due to the high pressures involved it has been extremely difficult to provide adequate sealing in the plumbing required to distribute the high pressure fluids. Various parts of plumbing present problem areas i.e. flared tube couplings, for example, but one particular problem area which the invention described hereafter is designed to alleviate is in the bosses found on pressure vessels, valves, manifolds, etc. for making external connections thereto.

A boss of this type generally has an internally threaded surface which receives an external connecting fitting of some type. It is customary to provide a high pressure seal between the external coupling and the boss to prevent leakage therebetween. It is common to provide a gasket or seal between connecting members making up a joint in any type of fluid system. However, in systems wherein extremely high pressures are utilized the sealing problems are much more severe and very stringent precautions are taken to assure against leakage. This is particularly true in the case of manned space vehicles wherein failure of the equipment could result in injury and possibly loss of life. In making a joint leak proof it is necessary that mating sealing surfaces be nearly perfect so that when tightened down against one another with a suitable gasket therebetween a perfect seal will be obtained. It can be readily appreciated that any irregularities in the sealing surfaces can result in areas wherein an imperfect seal is obtained and high pressure leaks can develop.

SUMMARY OF THE INVENTION

The present invention provides a gage for checking the concentricity and squareness of sealing surfaces of an internally threaded boss relative to the pitch diameter of the threads. The gage includes a housing having a threaded section on one end thereof that screws into the boss. The threaded section of the housing has a locking means mounted therein for preventing relative movement of the housing with respect to the boss. A sleeve is rotatably mounted on the housing and a plunger actuated dial indicator is mounted for rotation with the sleeve. The plunger of the dial indicator is adjusted to be in contact with the surfaces to be gaged so that rotation of the sleeve will result in movement of the dial indicator. Thus, any irregularities in the surface being gaged will be indicated on the face of the dial indicator.

BRIEF DESCRIPTION OF THE DRAWINGS

FIG. 1 is a pictorial view of the gage installed in a boss.

FIG. 2 is a view in cross section of the gage installed in a boss with the dial indicator removed from the gage.

FIG. 3 is a side elevation of a plunger actuated dial indicator.

FIG. 4 is a view a cross section of a bracket employed to attach the dial indicator to the gage.

DETAILED DESCRIPTION OF THE INVENTION

Referring now to FIG. 1 of the drawing, a gage 10 constructed in accordance with this invention is threadably mounted in a boss 12. The gage includes a tubular housing 14 (see FIG. 2) having an enlarged section 16 on one end thereof. Section 16 has a threaded surface 18 which engages a threaded surface 20 in boss 12. Section 16 has a series of slots 22 cut therein so as to divide the periphery thereof into a series of arcuate segments 24 which can be wedged into engagement with the threaded surface of the boss to immobilize housing 14 relative to the boss.

A locking device is mounted within housing 14 for immobilizing the housing with respect to the boss. This locking means includes a shaft 26 mounted for rotation within housing 14. Shaft 26 has a knurled knob 28 attached to the upper end thereof for rotating the shaft and the lower end of shaft 26 has a threaded portion 30 that turns in threaded section 32 formed on an internal surface of housing 14. A disc-shaped wedging member 34 is attached to shaft 26 by a bolt 36. As is apparent, rotation of shaft 26 by turning knob 28 will result in axial movement of wedging member relative to housing 14 so as to engage tapered interior surface 38 to wedge arcuate segments 24 against the threads of boss 12.

Housing 14 has a knurled knob 40 attached to the upper end thereof for turning threaded section 16 of the housing into the boss. A sleeve 42 is rotatably mounted on housing 14 and the sleeve has a mounting pin 44 fixed thereto for mounting a dial indicator 46 like that shown in FIG. 3. Sleeve 42 is a close fit about housing 14 and has a bearing surface 48 formed on the lower end thereof that turns on a matched bearing surface 50 formed on the housing to provide for wobble free rotation of the sleeve about the housing.

Dial indicator 46 includes an adapter 52 for mounting the dial indicator to sleeve 42 by use of a mounting bracket 54 shown in FIG. 4. Mounting bracket 54 includes a collar 58 which fits on mounting pin 44, and a bracket 56 which fits on adapter 52 to form a dove tail connection. Collar 58 and adapter 56 can be rotated relative to one another and when the dial indicator has been mounted on pin 44 and adjusted to a position similar to that shown in FIG. 1, nuts 60 and 62 can be tightened to secure the dial indicator. The dial indicator includes a pivotally mounted plunger 64 and a dial indicator face 66 which displays any displacement or movement of plunger 64. A dial indicator hand, the graduations on the dial indicator face and the internal mechanism connecting plunger 64 to the dial indicator hand has not been shown since these are common and well known.

The operation of the invention is as follows, assuming the dial indicator has been mounted upon mounting pin 44. The operator grasps the gage using knob 40 and turns threaded section 16 of the gage into the boss a desired depth so that plunger 64 of the dial indicator will contact any one of surfaces 68, 70 or 72 of the boss in a manner like that shown in FIG. 1. The operator then holds the housing against movement by means of knob 40 and rotates knob 28 in a counter-clockwise direction so as to draw disc-shaped member 34 up into the threaded section to perform a wedging action against the arcuate segments 24 and thereby immobilize the housing with respect to the boss. The dial indicator is then set to read zero by rotation of the dial indicator face in a manner which is commonly employed in dial indicators for adjustment to a zero reading. Then sleeve 42 is rotated so that the dial indicator plunger traverses the surface of the boss. Any irregularities in the squareness, flatness or concentricity of the surfaces relative to the pitch diameter of the boss threads will result in displacement of the plunger 64 and the magnitude of this displacement will be displayed upon the face of the dial indicator. When the magnitude of these irregularities exceed a certain tolerance limit which experience has shown will result in high pressure leakage, this fact can be determined and the boss reworked or discarded as desired.

What is claimed is:

1. A gage for checking the concentricity and squareness of surfaces on an internally threaded boss comprising:
 a housing having a segmented threaded section on one end thereof that forms a split collet for engagement with the interal threads of the boss;
 said threaded section of said housing having a tapering internal surface and threads formed on the exterior thereof so as to form threaded arcuate segments adapted to be threaded into the boss being checked;
 locking means mounted in said housing for engaging the threaded section thereof to wedge the threaded section against the internal threads of the boss and prevent relative movement between the boss and housing;
 said locking means including;
  a disc-shaped member disposed in said split collet and moveable axially with respect thereto to perform a wedging action against the tapering internal surface of said split collet so as to jam said threaded segments against the boss threads and immobilize the housing; and
 a shaft rotatably mounted in said housing and connected at one end thereof to said disc-shaped member, said shaft having an exterior threaded section adjacent said one end thereof which engages an internally threaded section of said housing; whereby rotation of said shaft relative to said housing will result in movement of said disc-shaped member relative to the split collet to perform its wedging function; and
 sleeve means rotatably mounted on said housing, said sleeve means having a dial indicator mounted thereon in a position to contact the surfaces being checked whereby rotation of the sleeve means will result in movement of the dial indicator and irregularities in the boss surfaces being checked will be displayed in the face of the dial indicator.

2. The gage recited in claim 1 which further includes;
 a first knurled knob mounted on said housing on the end thereof opposite said threaded section for rotating said housing to turn the threaded section into the boss being checked and to hold said housing against movement when engaging said locking means; and
 a second knurled knob mounted on said shaft opposite the end thereof that is connected to said disc-shaped member whereby the second knurled knob will be positioned adjacent the first knurled knob to facilitate turning of said shaft while holding said housing stationary.

3. The gage recited in claim 10 wherein said sleeve means includes:
 an outwardly projecting pin attached on which the dial indicator is adapted to be mounted; and
 a bearing surface on one end of said sleeve means which turns on a matched bearing surface on the housing to prevent wobbling of said sleeve means when rotated relative to said housing.

References Cited

UNITED STATES PATENTS

| | | | |
|---|---|---|---|
| 407,292 | 7/1889 | Harmer | 279—7 |
| 1,191,755 | 7/1916 | Andrews | 279—7 |
| 2,782,521 | 2/1957 | Parker. | |
| 2,884,699 | 5/1959 | Eisele. | |
| 3,296,705 | 1/1967 | Johnson. | |

LEONARD FORMAN, Primary Examiner

D. A. DEARING, Assistant Examiner

U.S. Cl. X.R.

279—2